United States Patent Office 2,721,832
Patented Oct. 25, 1955

2,721,832

CONTACTING GASOLINE FRACTIONS WITH ACTIVATED CARBON

Arthur A. Draeger, Baytown, Tex., assignor, by mesne assignments, to Esso Research and Engineering Company, Elizabeth, N. J., a corporation of Delaware No Drawing. Application November 12, 1952, Serial No. 320,157

7 Claims. (Cl. 196—36)

The present invention is directed to a method for treating gasoline fractions. In particular, the invention is directed to a method for treating naphtha fractions containing mono- and di-olefins and naphthenes for selective removal of the diolefins. The invention has particularly to do with reducing the engine fouling tendencies of gasolines containing diolefins and other hydrocarbons which affect deleteriously the gasoline performance in a motor.

The present invention may be briefly described as involving a method for treating a gasoline fraction containing a substantial amount of mono- and di-olefins and an effective amount of naphthenes which comprises contacting the gasoline fraction with an activated carbon at a temperature in the range between 450° and 630° F., at a pressure in the range from 0 to 200 pounds per square inch gauge and at a liquid space velocity of 0.5 to 10 v./v./hr. This treatment converts selectively the diolefins in the fraction without substantially converting the mono-olefins therein. This conversion of the diolefins does not substantially raise the final boiling point of the gasoline.

The activated carbon employed in the practice of the present invention may be any activated carbon available in commerce for example, the activated carbon may be prepared from various raw materials, such as cane sugar, kelp, bagasse, coal, lignite, peat, sawdust, charcoal, rich hulls, corn cobs, molasses, coconuts, carbonized sulfuric acid sludge resulting from the acid treatment of petroleum products, carbonized materials from cellulose manufacture, bones and even from blood. Activated bituminous carbon and activated coconut charcoal give very good results. The activated carbon may thus be prepared from numerous materials. Reference to methods of activation may be found in Hassler's "Active Carbons, The Modern Purifier," Githens-Sohl Corp., N. Y., Copyright, 1941, by Industrial Chemical Sales Division, West Virginia Pulp and Paper Company.

The activated carbon employed in the practice of the present invention may be suitably promoted with a small but effective amount of a potassium compound. For example, an amount of a potassium compound in the range from 0.2 to 10% by weight of the catalyst may be used. As examples of the potassium may be mentioned potassium carbonate, potassium oxide and potassium hydroxide. The presence of the potassium compound is desirable and effective in that it promotes the regeneration of the activated carbon which after a period of operating time may become fouled due to deposition of coke or heavy polymers. These deposits may suitably be removed by steaming at a temperature in the range between 900 and 1300° F. or by air oxidation at a temperature in the range between 850 and 1300° F.

The gasoline may be suitably contacted with activated carbon either in a fixed bed, a moving bed or in a fluidized operation. When the latter type of operation is employed, the activated carbon should be suitably finely divided to allow it to be fluidized and suspended in the various hydrocarbon fractions.

Suitably the activated carbon may have a particle size in the range from 30 to about 300 mesh with a preferred particle size in the range from 80 to 200 mesh. For fluidized operations, the particle size should be in the range from 10 to 150 microns.

The gasoline employed as a feed stock in the present invention will preferably be a cracked naphtha fraction boiling in the range from about 100° to about 430° F. but may boil in the range from about 120° to about 400° F. In fact, it is preferred that the feed stock to the present invention be depentanized.

The feed stock may be either a thermally or catalytically cracked fraction in the above boiling range. However, the feed stock may suitably be a naphtha from a suitable conversion operation wherein large quantities of mono-olefins and diolefins are produced. The feed stock must contain an effective amount of naphthenes in order to allow the beneficial effects of the present invention to be realized. The naphthenes are required to produce hydrogen for selective hydrogenation of the diolefins which deleteriously affect the performance of a gasoline in an internal combustion motor in that diolefins and like compounds, such as acetylene and derivatives thereof, form under the conditions of combustion in such engines varnish-like deposits which may make the engine inoperable after a short period of operation time. The amount of naphthenes present in the feed stock of the present invention should be of a sufficient amount to provide hydrogen to hydrogenate the di- and tri-olefins to mono-olefins. Since the dehydrogenation of one molecule of a naphthene yields three molecules of hydrogen and only one molecule of hydrogen is required to convert a diolefin to a mono-olefin it follows that the amount of naphthenes present in the feed stock should be at least one-third that of the diolefin. Similarly in the case of triolefins the amount of naphthene required is two-thirds of the amount of triolefin to be converted to mono-olefin. In gasolines produced by catalytic or by thermal cracking operations, the amount of naphthenes present therein may vary through rather wide limits depending upon operating conditions and feed stocks. In most instances the quantities of naphthenes present range upward from two per cent and the amount of diolefin adversely affecting engine quality ranges downward from two per cent so that the amount of naphthene present is sufficient for the proper conduct of the treating process disclosed herein.

However, if the feed stock of the present invention is deficient in naphthenes, it is within the purview and scope of my invention to add a sufficient amount of naphthenes in the boiling range of the feed stock to provide the naphthenes for the reaction.

While temperatures in the range from 450° to 630° F. may be employed, it is preferred that a temperature in the range from 550° to 625° F. be used. Good results may be obtained at about 625° F.

As mentioned before, the pressures may range from 0 to 200 pounds per square inch gauge. A preferred pressure range is from 50 to 150 pounds per square inch gauge with good results being obtained at about 100 pounds per square inch gauge.

A preferred liquid space velocity is in the range from 1 to 5 v./v./hr. although space velocities from 0.5 to 10 v./v./hr. may be used. Good results have been obtained at space velocities of about 1 v./v./hr.

The present invention will be further illustrated by a number of runs in which a depentanized thermally cracked naphtha was contacted with activated bituminous carbon. These runs were conducted over a 14-hour reaction period. The thermal naphtha contained mono-olefins and di-olefins as well as naphthenes. Operating conditions and inspections of the products are presented in the following table:

TABLE

| Operating Conditions: | | | | |
|---|---|---|---|---|
| Temperature, °F | | 805 | 684 | 627 |
| Pressure, p. s. i. g | | 100 | 100 | 100 |
| Liquid Space Velocity, V./V./Hour | | 0.99 | 1.02 | 1.00 |
| Yields, Percent of Feed:[1] | | | | |
| Liquid, Vol. Percent | | 98.6 | 100.4 | 100.0 |
| Gas, Wt. Percent[2] | | 0.3 | 0.2 | 0.1 |
| Carbon, Wt. | | 1.7 | 0.2 | 0.1 |
| $C_6+$ Liquid, Yields and Inspections: | | | | |
| Yield, Vol. Percent of Liquid Product | 100.0 | 90.5 | 92.0 | 93.9 |
| Yield, Vol. Percent of Feed | 100.0 | 89.3 | 92.3 | 93.9 |
| Olefins by Bromine No., Vol. Percent | 45.9 | 9.4 | 12.7 | 33.0 |
| Research Clear Octane No | 73.3 | 54.0 | 54.0 | 67.4 |
| Research (+1.5 cc. TEL) Octane No | 79.7 | 67.4 | 67.4 | 76.0 |
| Bomb Sulfur, Wt. Percent | 0.22 | 0.14 | 0.10 | 0.10 |
| ASTM Distillation, °F.— | | | | |
| IBP | 138 | 160 | 156 | 164 |
| 5% | 169 | 185 | 186 | 184 |
| 10% | 179 | 193 | 191 | 192 |
| 50% | 231 | 233 | 235 | 237 |
| 90% | 304 | 309 | 307 | 307 |
| 95% | 330 | 342 | 335 | 334 |
| F. B. P | 360 | 380 | 389 | 370 |
| Conversion, Based on $C_6+$ Fraction: | | | | |
| Olefin plus Diolefin (by Bromine No.), Percent | | 79.8 | 72.4 | 28.4 |
| Diolefin (by UV. $K_{235}$), Percent | | 75.1 | 79.1 | 80.6 |
| Ratio, Diolefin Conversion/Olefin+Diolefin Conv | | 0.94 | 1.09 | 2.84 |

[1] Based on 100% material balance.
[2] Based on weight of catalyst residue plus carbon dioxide formed by burning out unit following run.

It will be seen from the foregoing data that at temperatures above about 630° F. that the conversion of diolefins is high but that the conversion of mono-olefins is high, whereas at temperatures below 630° F. the conversion of diolefins is low. Further it is to be noted from the data that the final boiling point is substantially unaffected showing that the diolefins are hydrogenated to compounds within the boiling range of the feed.

It is noteworthy that the octane number of the stock treated with activated carbon at a temperature below 630° F. is substantially higher than that obtained by treatment at higher temperatures. At yet lower temperatures than 627° F. substantially higher octane numbers may be obtained approaching or exceeding the octane number of the feed stock. The sulfur of the product treated in accordance with the present invention also reflects that the treatment with activated carbon results in conversion of sulfur compounds.

The data in the foregoing table show the beneficial effects of the present invention in reducing the diolefin content of a cracked naphtha.

While the invention is particularly applicable to treatment of naphtha fractions containing diolefins, the invention should not be limited thereto. It is contemplated that the invention encompasses the reaction of a diolefin in the presence of naphthene. For example, a naphthenic hydrocarbon, such as a cyclic naphthenic hydrocarbon having at least 5 or 6 carbon atoms in a ring may be reacted in the presence of di-olefin hydrocarbons to convert the diolefins to mono-olefins.

As examples of the naphthenes which suitably may be employed mention may be made of cyclopentanes and cyclohexanes, such as cyclopentane, methylcyclopentane, cyclohexane, methylcyclohexane and the like. Cyclopentane homologues do not yield hydrogen directly for use in the hydrogenation of diolefins under the operating conditions of this process; however, cyclopentane homologues are isomerized to the corresponding cyclohexane homologues which readily dehydrogenate to the corresponding aromatic compounds making hydrogen available for reaction with diolefins. For example, 1,2 dimethylcyclopentane can be isomerized to methyl cyclohexane which is in turn dehydrogenated to toluene yielding three molecules of hydrogen for reaction. As examples of the di-olefins the following may be mentioned: cyclopentadiene, styrene and substituted styrene, cyclohexadiene, substituted butadiene, conjugated diolefins, tetralin and the like.

The nature and objects of the present invention having been completely described and illustrated, what I wish to claim as new and useful and to secure by Letters Patent is:

1. A method for treating a gasoline fraction containing a substantial amount of mono- and diolefins and an effective amount of naphthenes at least one-third of the amount of the diolefins in said fraction which comprises contacting said fraction with an activated carbon at a temperature in the range between 450° and 630° F., at a pressure in the range from 0 to 200 pounds per square inch gauge, and at a liquid space velocity in the range from 0.5 to 10 v./v./hr. to convert selectively the diolefins in said fraction without substantially converting the monoolefins.

2. A method in accordance with claim 1 in which the gasoline fraction is a cracked naphtha.

3. A method in accordance with claim 1 in which the activated carbon is promoted with a small but effective amount of a potassium compound.

4. A method in accordance with claim 1 in which the activated carbon is activated coconut charcoal.

5. A method in accordance with claim 1 in which the temperature is in the range between 550° to 625° F., the pressure is in the range from 50 to 150 pounds per square inch gauge, and the space velocity is in the range from 1.0 to 5.0 v./v./hr.

6. A method for treating a cracked naphtha containing a substantial amount of mono- and di-olefins and an effective amount of naphthenes at least one-third of the amount of the diolefins in said naphtha which comprises contacting said naphtha with activated bituminous carbon at a temperature of about 625° F., at a pressure of about 100 pounds per square inch gauge, at a liquid space velocity of about 1.0 v./v./hr. to convert selectively the di-olefins in said naphtha without substantially converting the mono-olefins and without raising substantially the final boiling point of said naphtha.

7. A method for hydrogenating a di-olefinic hydrocarbon in the gasoline boiling range which comprises forming a mixture of said diolefinic hydrocarbon and a naphthenic hydrocarbon in the gasoline boiling range and contacting said mixture with an activated carbon at a temperature in the range from 450° to 630° F., at a pressure in the range from 0 to 200 pounds per square inch gauge and at a liquid space velocity in the range from 0.5 to 10 v./v./hr. to hydrogenate said di-olefins and to form a product containing mono-olefins, the amount of said naphthenic hydrocarbon being at least one-third of the amount of said diolefinic hydrocarbon.

References Cited in the file of this patent

UNITED STATES PATENTS

| 2,253,308 | Rosen | Aug. 19, 1941 |
| 2,481,300 | Engel | Sept. 8, 1949 |
| 2,542,970 | Jones | Feb. 27, 1951 |

OTHER REFERENCES

Berkman et al.: Catalysis, pages 815, 819 and 822 (1949).